United States Patent [19]

Conlyn, Jr. et al.

[11] Patent Number: 4,946,013
[45] Date of Patent: Aug. 7, 1990

[54] APPARATUS FOR MANUAL OPERATION OF VEHICLE BRAKE AND ACCELERATOR PEDALS

[76] Inventors: Andrew C. Conlyn, Jr., P.O. Box 3037, Pineland, Fla. 33945; John V. Masters, 315 Berkman Rd., Augusta, Ga. 30906

[21] Appl. No.: 364,060

[22] Filed: Jun. 12, 1989

[51] Int. Cl.$^5$ .................... B60K 41/20; G05G 9/02; G05G 1/14
[52] U.S. Cl. ............................ 192/1.52; 74/482; 180/333
[58] Field of Search ................. 192/1.52; 74/481, 482; 180/333

[56] References Cited

U.S. PATENT DOCUMENTS

| | | | |
|---|---|---|---|
| 2,602,348 | 7/1952 | Wilson | 192/1.52 X |
| 2,724,285 | 11/1955 | Lerman | 74/481 |
| 2,777,335 | 1/1957 | Engberg et al. | 192/1.52 X |
| 2,826,089 | 3/1958 | Hammack | 74/481 X |
| 2,855,797 | 10/1958 | Dunn, Jr. | 192/1.52 X |
| 2,875,638 | 3/1959 | Sell | 192/1.52 X |
| 3,226,997 | 1/1966 | Malloy | 192/1.52 |
| 4,228,865 | 10/1980 | Appley | 180/333 |
| 4,476,954 | 10/1984 | Johnson et al. | 180/333 |

Primary Examiner—Allan D. Herrmann
Attorney, Agent, or Firm—Laurence R. Brown

[57] ABSTRACT

A device for manually operating the brake and accelerator pedals of a vehicle. The device is removably clamped to each of the conventional brake and accelerator pedals of a vehicle and includes a control lever that extends between respective pivot points that are fixed relative to and spaced outwardly from each of the brake and accelerator pedals. The control lever includes an outwardly extending portion that extends beyond the brake pedal in a direction opposite from the accelerator pedal, and a control handle is pivotally connected at the outer end of the lever extension. The control handle is operable by the user, and when pulled in a direction toward the user the device causes the braking actuator to move in a brake releasing direction while simultaneously causing the accelerator to open the throttle and thereby permit the vehicle to move. Pushing downwardly on the control handle in a direction toward the brake pedal will cause the device to push the brake pedal downwardly and thereby actuate the braking system, while simultaneously retracting the accelerator pedal to close the throttle and thereby assist in slowing the vehicle. The brake and accelerator pedals are controlled in such a way that operation of the device activates one pedal and precludes activation of the other pedal. Also, when no pressure is applied to the handle in either direction both the brake and accelerator pedals are in their off position. The device is simple to construct, and is thereby inexpensive, and it also adjustable and can be readily and quickly attached to or removed from a vehicle without requiring modifications thereto.

19 Claims, 3 Drawing Sheets

APPARATUS FOR MANUAL OPERATION OF VEHICLE BRAKE AND ACCELERATOR PEDALS

BACKGROUND OF THE INVENTION

1. Field of the Invention

This invention relates to devices for operating by hand the normally foot-operated brake and accelerator pedals of an automobile or other motor vehicle. More particularly, the present invention relates to a device that can be quickly attached to the existing brake and accelerator pedals of virtually any vehicle, and without the need for special modifications to the vehicle, so that the vehicle can be operated by foot actuation of the pedals, if desired, after removal of the device from the pedals.

2. Description of the Related Art

Conventional motor vehicles, such as automobiles, are customarily adapted for operation of the braking system and the throttle or accelerator system by means of foot-operated pedals. However, persons who have injured one or both legs, or for some other reason are unable to operate the brake and accelerator pedals of an automobile in the usual manner, can readily make use of a device that permits the pedals to be actuated by an arrangement that permits manual operation and control, rather than foot operation and control. Over the years, many different systems have been devised to permit such manual operation. For example, in U.S. Pat. No. 3,226,997, which issued Jan. 4, 1966, to Paul V. Malloy, there are disclosed separate actuating rods for the brake and accelerator pedals of an automobile, the actuating rods being connected with respective operating members that are slidable about the periphery of the steering wheel. However, such a system is cumbersome to operate during turning movements of the vehicle.

In U.S. Pat. No. 4,476,954, which issued Oct. 16, 1984, to Dale R. Johnson et al., a manually operable control system is provided that utilizes a two-axis joy stick to operate an electromagnetic servo system that controls individual linear actuators that are connected with the brake pedal and with the accelerator pedal. The system also includes a rotary actuator connected with the joy stick for operating the steering system. However, the Johnson et al. device is very complex and expensive, and does not readily permit conversion between manual operation of the pedals and foot operation.

In U.S. Pat. No. 4,228,865, which issued Oct. 21, 1980 to Robert J. Appley, there is disclosed a vehicle control system for manual operation of brake and accelerator systems of a vehicle. A manual lever is provided and is connected with the braking and throttle systems to permit manual operation. However, the Appley device requires substantial modifications to a conventional automobile, and therefore it also is not readily convertible to permit use with foot-operated pedals and also with manually controlled pedals.

In view of the shortcomings of the prior art devices, it is an object of the present invention to provide a device that can quickly be fitted to the conventional foot-operated pedals of an automobile, without the need for any modifications to the pedals, and that can also be quickly removed, to permit operation either manually or by foot operation, and without the need for extensive changes to the vehicle.

It is another object of the present invention to provide a manual control device for controlling the braking and accelerator systems of the vehicle, wherein the device is of simple construction and is relatively inexpensive to manufacture, and can easily removed from one vehicle and installed in another vehicle, for example, the removal from the owner's vehicle and its installation in a rental vehicle.

SUMMARY OF THE INVENTION

Briefly stated, in accordance with one aspect of the present invention, there is provided a hand operated control device for controlling a vehicle having a brake actuator for selectively applying and releasing a braking system, and also having a throttle actuator independent of and spaced from the brake actuator for selectively moving a throttle between closed and open positions. The device includes a first support that is connected with the brake actuator for pivotally supporting a control lever for pivotal movement about a first pivot axis. A second support is provided and connected with the throttle actuator for pivotally supporting the control lever for pivotal movement about a second pivot axis spaced from the first pivot axis. A control lever extends between and is pivotally connected with each of the first and second supports at the first and second pivot axes, respectively. The control lever has a longitudinal axis that extends between the first and second pivot axes, and that includes an extension portion that extends outwardly along the control lever longitudinal axis from the first pivot axis in the direction opposite from the second pivot axis to define a lever arm. A control handle is connected with the lever arm at a point spaced from the first pivot axis to permit hand operation by the user of the brake actuator and of the throttle actuator, to control the motion of the vehicle.

DESCRIPTION OF THE PREFERRED EMBODIMENTS

Figure 1:
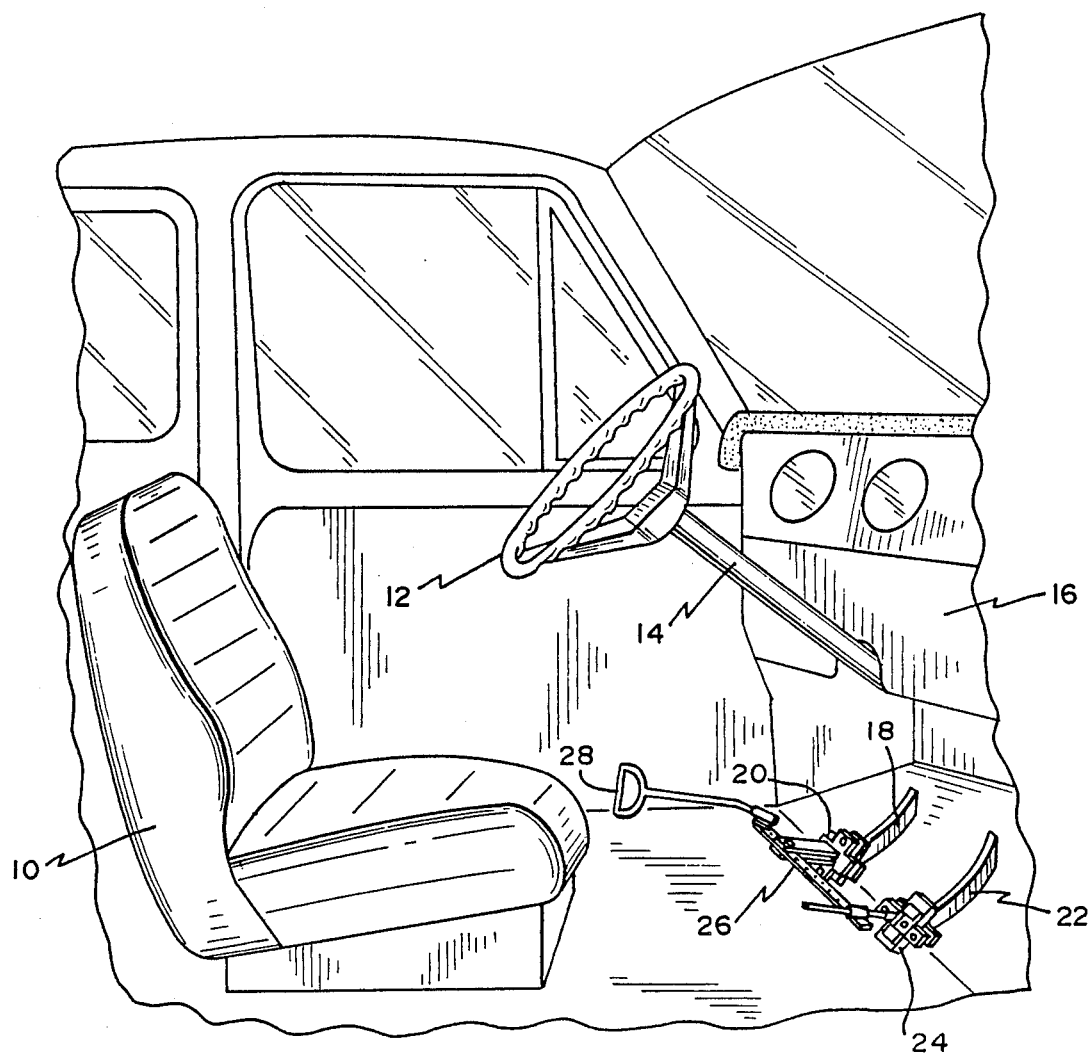
FIG. 1 is a fragmentary perspective view of the driver's seat of an automobile showing a manually operable vehicle control device in accordance with the present invention.

Referring now to the drawings, and particularly to FIG. 1 thereof, there is shown a side elevational view of the area adjacent to the driver's seat of an automobile and showing several of the operating and control devices, as well as the apparatus of the present invention. The automobile includes a driver's seat 10, a conventional steering wheel 12, which preferably is connected with a power steering system (not shown), the steering wheel being rotatably supported on a steering column 14 that is supported by a dashboard 16. Positioned below dashboard 16 and suspended from a suitable support structure (not shown), are a pivotally supported brake lever 18 terminating in a generally rectangular brake pedal 20 having a side-to-side dimension that is usually greater than the top-to-bottom dimension and that is adapted to be operated by either foot of the driver when the vehicle has an automatic transmission.

To the right of brake lever 18 is a pivotally supported accelerator actuator lever 22, at the lowermost end of which is positioned an accelerator pedal 24 having a greater top-to-bottom dimension than the side-to-side dimension and that is adapted to be operated by the right foot of the driver.

The apparatus 26 in accordance with the present invention is connected with each of the brake and the accelerator pedals in a manner to be hereinafter described, and a manually operable handle 28 is provided so that when the handle is moved in a direction toward the front of the vehicle, or is pushed away from the driver, apparatus 24 transfers the pushing force to and operates brake pedal 20 to slow or stop the vehicle while simultaneously pulling upwardly on accelerator pedal 24 to substantially close the throttle and thereby reduce the amount of fuel-air mixture that is supplied to the engine. When handle 28 is moved in a direction toward the rear of the vehicle, or is pulled toward the driver, apparatus 24 transfers the pulling force to brake pedal 20 to pull it against its outermost stop (not shown) and thereby disengage the braking system by releasing brake application forces, and simultaneously causing accelerator pedal 24 to be depressed, thereby opening the throttle and permitting additional fuel-air mixture to enter the engine to cause the vehicle to move in a forward or rearward direction, depending upon the transmission shift lever position. In that regard, it is intended that the present device be utilized on vehicles having automatic transmissions, which thereby precludes any consideration of control or operation of a clutch pedal. Additionally, although not absolutely essential, preferably the vehicle includes power-operated brakes and an automatic cruise control system for greater operating convenience.

Figure 2:
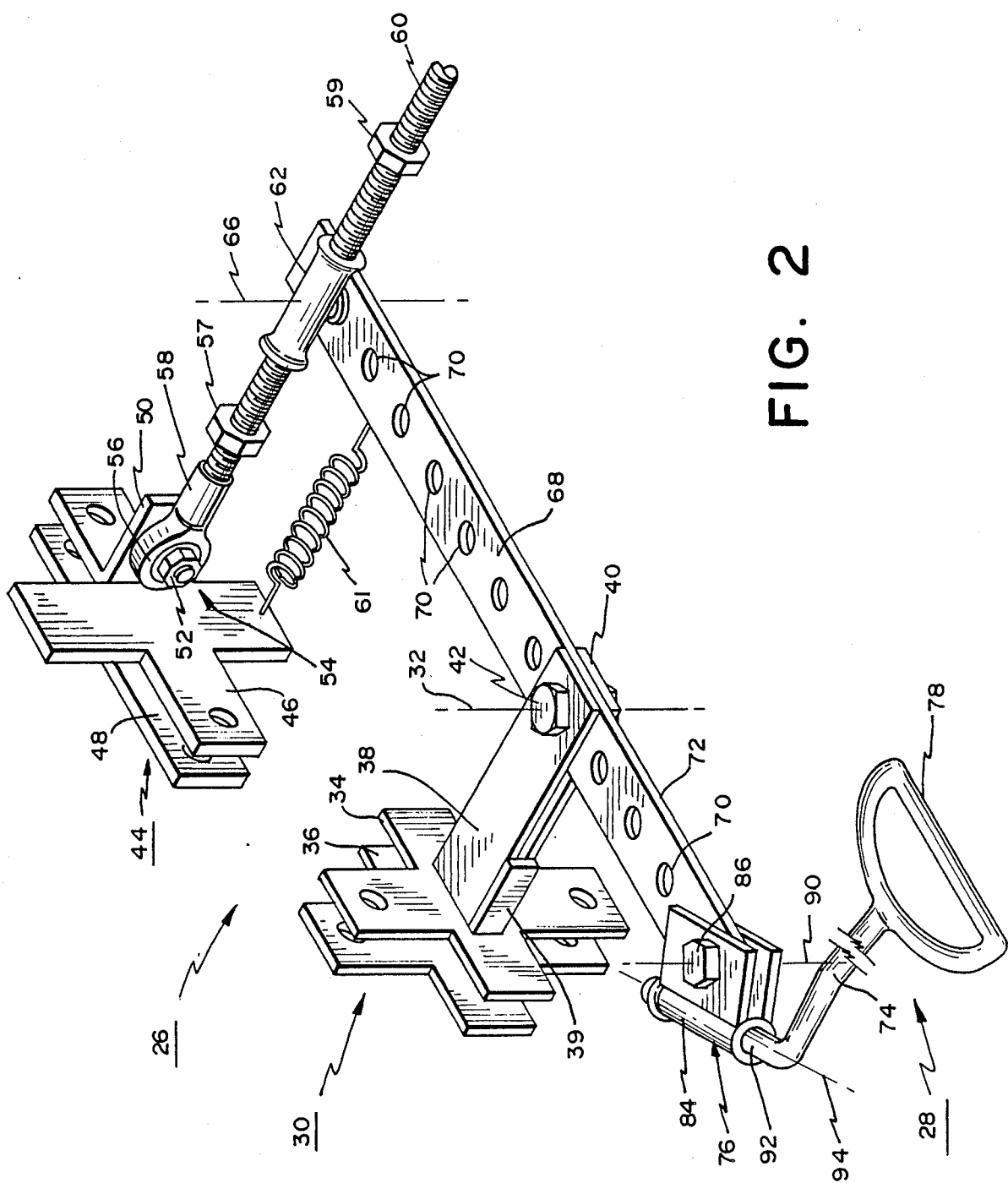
FIG. 2 is an enlarged, fragmentary perspective view showing the structure of the control apparatus of FIG. 1 in greater detail.

Referring now to FIG. 2, apparatus 26 is shown in perspective view and in greater detail to illustrate more clearly the structure of the various elements of which it is composed. The apparatus includes a first support means that is in the form of a brake pedal clamp 30 to provide a support for a first pivot axis 32. Brake pedal clamp 30 includes a front clamping member 34 and a rear clamping member 36, each of which, as shown, are of cruciform shape, although other shapes can also be employed, if desired. Each of clamping members 34 and 36 have two pairs of aligned apertures to receive respective clamping bolts (not shown) so that the respective clamping members can be positioned against the respective front and rear surfaces of a brake pedal (not shown) and clamped thereto by tightening the respective clamping bolts. Although shown for illustrative purposes as having a specific form, other clamping arrangements and other clamping member configurations can also be used, and preferably the clamping arrangement permits quick release and quick attachment of the clamping members.

Front clamping member 34 includes an upper spacer bar 38 and a lower spacer bar 40, each of which extends outwardly toward the driver and can be of any convenient length, preferably as short as possible while allowing full movement of brake pedal 20 and convenient positioning of handle 28 relative to the driver. Each of spacer bars 38, 40 includes an aperture adjacent its outermost end to receive a connecting bolt 42 that defines pivot axis 32. A stop bar 39 is positioned along the left edges of front and rear clamping members 34 and 36 to provide a positive stop for control lever movement, as will hereinafter be explained.

A similar second support means is provided in the form of throttle or accelerator pedal clamp 44, which includes a front clamp 46 and a rear clamp 48, similar to those of brake pedal clamp 30, but rotated 90 degrees in order to be able to accommodate the different orientation of the long and short sides of the accelerator pedal as compared with the orientation of corresponding sides of the brake pedal. Front clamp 46 includes a support bar 50 that extends in a direction toward the driver and carries a portion of a ball socket 52 that forms part of a ball joint assembly 54. Connected to ball socket 52 is a ball 56 that is movable relative to ball socket 52 and that includes a tubular extension 58. Extension 58 extends outwardly toward the driver and is internally threaded to receive an externally threaded adjustment rod 60. Adjustment rod 60 slidably carries a tee sleeve 62 that includes a threaded rod or bolt 64 (see FIG. 3) that extends in a direction substantially perpendicular to the axis of threaded adjustment rod 60 and defines a second pivot axis 66 that is spaced laterally from first pivot axis 32. The distance that tee sleeve 62 can slide along adjustment rod 60 is determined by the positions of respective adjustment and stop nuts 57, 59 that are threadedly carried by the adjustment rod.

Extending between and connected with each of first and second pivot axes 42 and 66 is a control lever 68 in the form of an elongated bar having a series of spaced holes 70 to permit adaptation of the device to a range of lateral spacings between the brake and accelerator pedals on a variety of vehicles. One of holes 70 in control lever 68 receives the rod or bolt 64 that extends from threaded tee sleeve 62 (see FIG. 3), and another hole receives connecting bolt 42, which also passes through the apertures at the forwardmost ends of the respective spacer bars 38 and 40 that extend from brake pedal clamp 30. Control lever 68 is thereby pivotally supported from brake pedal clamp 30 and is also pivotally supported from accelerator clamp 44.

As shown in FIG. 2, control lever 68 includes an extension 72 that projects outwardly beyond first pivot axis 32 and substantially along the longitudinal axis of the control lever on the opposite side of brake pedal clamp 30 from accelerator pedal clamp 44. Extension 72 terminates at a free end that includes a further hole 70 (see FIG. 4) spaced from pivot axis 32 to permit pivotal attachment of control handle 28 to control lever 68. Control handle 28 includes an elongated body portion 74 that extends from a connection portion 76 that is pivotally connected with control lever 68. Handle 28 extends from control lever 68 toward the driver and terminates in a hand grip 78 that can be of "D" shape, as shown, or any other convenient shape that might be desired.

Figure 4:
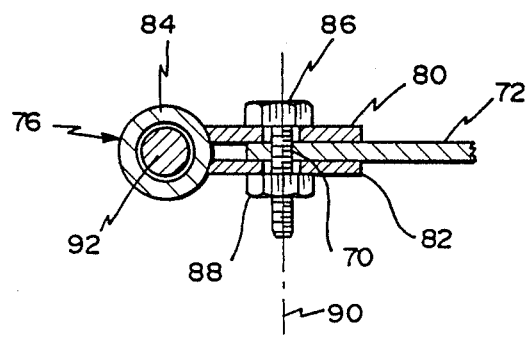
FIG. 4 is a fragmentary cross-sectional view taken along the line 4—4 of FIG. 2.

Connection 76 for connecting control handle 28 to control lever 68 is shown in cross section in FIG. 4. A pair of spaced, parallel upper and lower control handle brackets 80, 82, respectively, extend laterally outwardly in the same direction from a tubular sleeve 84 and include respective aligned apertures to permit pivotal connection of handle 28 with control lever 68 by means of a bolt 86 and nut 88 as shown, or, alternatively, the connection can be by means of a rivet, if desired. Bolt 86 defines handle first pivot axis 90 that extends in a direction perpendicular to the longitudinal axis of control lever extension 72.

Tubular sleeve 84 pivotally receives a cylindrical extension 92 of control handle 28, and, as shown, the extension can be angularly offset relative to handle body portion 74, if desired. The forwardmost end of extension 92, closest to brake pedal clamp 30, can be restrained from axial movement by means of a cotter pin (not shown) or the like. The axis of sleeve 84 defines handle second pivot axis 94 and is perpendicular to first pivot axis 90. Connection 76 is thus configured so that control handle 28 can be simultaneously pivoted about the two separate, mutually perpendicular pivot axes 90 and 94 to thereby permit orientation of control handle 28 so that hand grip 78 is in a convenient position for use by the driver using either his right or his left hand.

Figure 3:
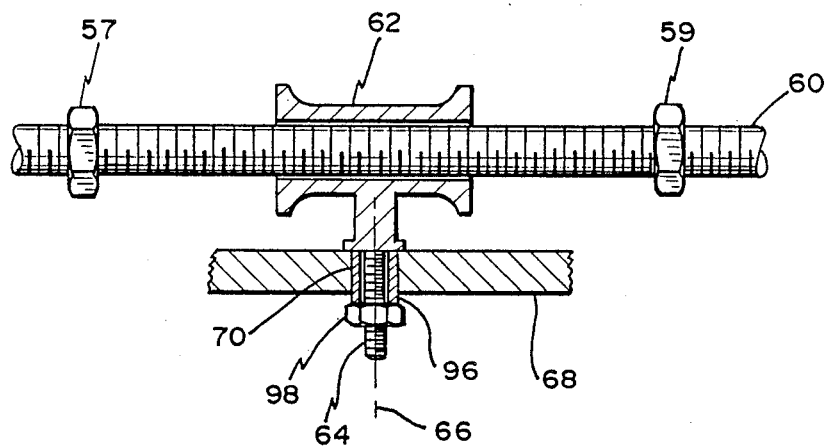
FIG. 3 is a fragmentary cross-sectional view taken along the line 3—3 of FIG. 2.

The connection between threaded tee sleeve 62 and control lever 68 is shown in greater detail in FIG. 3. Tee sleeve 62 is so positioned along threaded rod 60 that the orientation of control lever 68 and the position of control handle 28 are in the desired position for use on a particular vehicle. If adjustment of the position of hand grip 78 toward or away from the driver is needed, such adjustment can be accomplished by turning either or both of adjustment nuts 57, 59 so that tee sleeve 62, and pivot axis 66, can be repositioned inwardly or outwardly relative to the accelerator pedal while brake pivot axis 42 remains fixed in position.

Rod or bolt 64 that extends from tee sleeve 62 passes through a hole 70 in control lever 68, and preferably includes an annular spacer sleeve 96, so that when connecting nut 98 is tightened, some slack remains between tee sleeve 62 and nut 98 to permit free and unimpeded movement of control lever 68 relative to tee sleeve 62.

In operation, when apparatus 26 as shown in FIG. 2 is attached to the brake and accelerator pedals 20, 24, respectively, of a vehicle, operation of accelerator pedal 24 is effected by the driver pulling on control handle 28, which causes brake pedal clamp 30 to pull brake pedal 20 toward the driver so that the brake pedal operating apparatus is against a brake pedal stop (not shown). During acceleration there is no downward operating pressure applied to brake pedal 20 so that the braking system is not activated. Because brake pedal clamp 30 is substantially fixed in space under those conditions, control lever 68 will pivot about first control lever pivot axis 32, which will also then be fixed in space, and control lever 68, acting through tee sleeve 62 bearing against adjustment nut 57, will cause threaded adjustment rod 60 to move in an axial direction toward accelerator pedal 24, to thereby act on that pedal through ball joint assembly 54 and accelerator pedal clamp 44 to depress accelerator pedal 24 and thereby cause the throttle to open and provide the desired level of torque to the driving wheels of the vehicle. As will be apparent to those skilled in the art, the distance control handle 28 is pulled toward the driver will determine the distance accelerator 24 is moved, and consequently the speed of the vehicle. In that regard, it should be noted that pulling outwardly on control handle 28 maintains the braking system in an inactive state while simultaneously activating the throttle system.

When it is desired to operate the braking system and to slow the vehicle or to bring it to a stop, control handle 28 is pushed forwardly in a direction away from the driver and toward brake pedal 20, which movement causes control lever 68 to contact stop 39 which causes front clamp 34 and first control lever pivot axis 42 to move downwardly and thereby provide an actuating force to move the brake pedal downwardly and actuate the braking system. At the same time that the brake pedal is moved in a brake actuation direction, the physical arrangement of the device is such that there is a moment imposed upon control lever 68 acting about first control lever pivot axis 42, which causes tee sleeve 62 to move rearwardly toward the driver until it is stopped by adjustment nut 59, and to pull rearwardly on accelerator pedal 24, through rod 60, to thereby close the throttle and reduce the amount of fuel-air mixture that is supplied to the engine. A return spring 61 can be positioned between rear clamping member 46 and control lever 68 to assist in returning the accelerator pedal to its rest position. Thus, when control handle 28 is moved in a forward direction the throttle system is disabled while the braking system is enabled.

It will be apparent to those skilled in the art that the amount of force that is required by an operator to operate the device of the present invention is determined largely upon the forces of the springs that are part of the respective brake and accelerator actuation structure, as well as return spring 61, but it is also a function of the length of lever extension 78 and of the spacing between first and second pivot axes 32 and 66. Furthermore, the length of the extension lever can be controlled by selecting which of the apertures 70 along control lever 68 are utilized to define the first and second control lever pivot axes. For example, and referring once again to FIG. 2, if first control lever pivot axis 32 passes through the third hole 70 from the left end of the control lever, instead of through the fifth hole as shown, and second control lever pivot axis 66 passes through the third hole 70 from the right end of control lever 68, rather than through the endmost hole as shown, then extension lever 72 will be shorter and as a consequence greater operating forces will be required to operate the device. Similarly, arranging the device so that first control lever pivot axis 32 is at a greater distance from handle pivot axis 90 will increase the lever arm lengths for both brake and accelerator operation, and thereby reduce the amount of manual effort necessary to operate the device.

It should therefore be apparent that the present invention provides substantial improvements over the prior art devices in that it is simple in construction, it is easy to attach to an existing vehicle, and it is adaptable to vehicles having different spacings between brake and accelerator pedals. Additionally, the operation of the device is such that movement of a single lever simultaneously controls both the brake and throttle pedals and in such a way that positive operation of one precludes simultaneous positive operation of the other. Furthermore, the operation of the device requires the use of only one hand, thus leaving the other hand free for steering the vehicle.

Although particular embodiments of the present invention has been illustrated and described, it will apparent to those skilled in the art that various changes and modifications can be made without departing from the spirit of the present invention. It is therefore intended to encompass within the appended claims all such changes and modifications that fall within the scope of the present invention.

What is claimed is:

1. A hand operated control device for controlling a vehicle having a movable brake actuator for selectively applying and releasing a braking system, and having an accelerator actuator independent of and spaced from the brake actuator for selectively moving a throttle between closed and open positions, said device comprising:

(a) first primary support means connected with the brake actuator for pivotally supporting a control lever means for pivotal movement about a first pivot axis movable with the brake actuator;

(b) second auxiliary support means connected with the accelerator actuator for movement of the accelerator by movement of the control lever means;

(c) said control lever means extending between and pivotally connected with the first movable support means and including an extension extending outwardly from the first pivot axis in a direction opposite from accelerator actuator to define a lever arm; and (d) manually operable control handle means connected with the lever means extension at a point spaced from the first pivot axis, for hand operation in a linear direction toward and away from a vehicle user to operate respectively the brake actuator and the accelerator actuator for control of motion of the vehicle.

2. A device in accordance with claim 1, wherein the first support means is removably connected with the brake actuator.

3. A device in accordance with claim 2, wherein the brake actuator is a brake pedal and the first support means is clampingly connected with the brake pedal.

4. A device in accordance with claim 3, wherein the first pivot axis is spaced from the brake pedal in a direction toward the user.

5. A device in accordance with claim 1, wherein the second support means is removably connected with the accelerator actuator.

6. A device in accordance with claim 5, wherein the accelerator actuator is an accelerator pedal and the second support means is clampingly connected with the accelerator pedal.

7. A device in accordance with claim 1, wherein the first support means is removably connected with the brake actuator, and the second support means is removably connected with the accelerator actuator.

8. A device in accordance with claim 2, wherein the brake actuator is a brake pedal and the first support means is clampingly connected with the brake pedal, and the accelerator actuator is an accelerator pedal, and the second support means is clampingly connected with the accelerator pedal.

9. A device in accordance with claim 1, wherein the second support means includes:
(a) clamping means for clamping engagement with an accelerator actuator pedal;
(b) actuating rod means extending from the accelerator actuator pedal to the control lever means; and
(c) connector means carried by the clamping means for connecting an actuating rod means with the clamping means.

10. A device in accordance with claim 9, wherein the connector means is a ball joint.

11. A device in accordance with claim 9, wherein the actuating rod means includes adjusting means for adjusting the distance between the accelerator actuator pedal and the control lever means.

12. A device in accordance with claim 11, wherein the adjusting means includes a pair of spaced stops carried by the actuating rod means.

13. A device in accordance with claim 12, including spring means extending between the clamping means and the control lever means of assisting return of the accelerator actuator pedal to a closed throttle position.

14. A device in accordance with claim 1, wherein movement of the control handle means toward the user results in pivotal movement of the control lever means about the first pivot axis to move the accelerator actuator away from a closed position to propel the vehicle and wherein movement of the control handle away from the user results in pivotal movement of the control lever means about the second pivot axis to move the brake actuator in a brake actuation direction.

15. A hand operated control device for controlling a vehicle having a brake actuator for selectively applying and releasing a braking system, and having an accelerator actuator independent of and spaced from the brake actuator for selectively moving a throttle between closed and open positions, said device comprising:

(a) first support means connected with the brake actuator for pivotally supporting a control lever means for pivotal movement about a first pivot axis;

(b) second support means connected with the throttle accelerator actuator for pivotally supporting the control lever means for pivotal movement about a second pivot axis spaced from the first pivot axis;

(c) control lever means extending between and pivotally connected with the first and second movable support means at the first and second pivot axes, respectively, the control lever means and including an extension extending outwardly from the first pivot axis in a direction opposite from the second pivot axis to define a lever arm;

(d) control handle means connected with the lever arm at a point spaced from the first pivot axis, for hand operation by the user of the brake actuator and the throttle accelerator actuator to control the motion of the vehicle, and (e) a third pivot axis carried on said extension of the control lever means for pivotally carrying the control handle means to permit the control handle means to be positioned for convenient actuation by a user.

16. An accelerator and brake pedal control apparatus for manually controlling the operation of a vehicle having a pair of spaced, independently operable foot actuatable brake and accelerator pedals, said apparatus comprising:

(a) first connecting means for connecting a first pivot axis to the brake pedal of the vehicle;

(b) second connection means for connecting a second pivot axis to the accelerator pedal of the vehicle;

(c) lever means extending between and pivotally connected with each of the first and second pivot axis, the lever means including an outer extension bar extending laterally beyond at least the first pivot axis in a direction opposite from the second pivot axis; and (d) manual actuation means connected with the outer extension bar and movable in a direction toward and away from the pedals to pivot the lever means about the first pivot and cause actuation of the brake to initiate and maintain a braking operation, and simultaneously retracting the accelerator and holding it so that an associated throttle is against its stop to reduce the engine output in a first direction of movement of the handle means and to cause the vehicle to stop, and operable to pivot the lever means about the second pivot point and actuate the accelerator to initiate and maintain forward motion of the vehicle and simultaneously drawing the brake pedal toward the operator in a direction opposite to a braking operation.

17. Apparatus in accordance with claim 16, wherein said outer extension bar is positioned on the side of the brake pedal opposite the accelerator pedal.

18. An accelerator and brake pedal control apparatus for manually controlling the operation of a vehicle having spaced, independently operable foot actuatable brake and accelerator pedals, said apparatus comprising:
  (a) first connecting means for connecting a first pivot axis to the brake pedal of the vehicle to move with the brake pedal;
  (b) second connection means for connecting a second pivot axis to the accelerator pedal of the vehicle to move with the accelerator pedal;
  (c) control lever means extending between and connected with each of the first and second pivot axes to thereby control the braking and acceleration by movement of the control lever means, the lever means including an outer extension bar extending laterally beyond the brake pedal in a direction opposite from the accelerator pedal; and
  (d) manual actuation means connected with the outer extension bar and movable in a direction toward the pedals to move the brake pedal and cause actuation of the brake to initiate a braking operation while simultaneously retracting the accelerator pedal toward a closed position and holding it so that an associated throttle is positioned to reduce the engine output in a first direction of movement of the handle means for causing the vehicle to stop, and operable by movement away from the pedals in a second direction of movement to pivot the lever means about the brake pedal to actuate the accelerator toward an open position to initiate and maintain forward motion of the vehicle while simultaneously drawing the brake pedal toward the operator in a direction opposite to a braking operation.

19. Apparatus as defined in claim 16 further comprising spring means coupled between the control lever means and the accelerator pedal for assisting return of the accelerator pedal to a closed throttle position.

* * * * *